United States Patent [19]
Moz

[11] Patent Number: 5,542,396
[45] Date of Patent: Aug. 6, 1996

[54] METHOD FOR VENTILATING A FUEL SYSTEM FOR AN INTERNAL COMBUSTION

[75] Inventor: Rudolf Moz, Moeglingen, Germany

[73] Assignee: Robert Bosch GmbH, Stuttgart, Germany

[21] Appl. No.: 412,800

[22] Filed: Mar. 29, 1995

[30] Foreign Application Priority Data

Apr. 9, 1994 [DE] Germany .......................... 44 12 275.6

[51] Int. Cl.$^6$ ................................................. F02M 25/08
[52] U.S. Cl. ................................................. 123/520
[58] Field of Search ........................................ 123/520

[56] References Cited

U.S. PATENT DOCUMENTS

| | | | |
|---|---|---|---|
| 5,333,589 | 8/1994 | Otsuka | 123/520 |
| 5,339,788 | 8/1994 | Blumenstock | 123/520 |
| 5,355,864 | 10/1994 | Kuroda et al. | 123/520 |
| 5,363,823 | 11/1994 | Yamashita et al. | 123/520 |
| 5,372,117 | 12/1994 | Denz et al. | 123/520 |
| 5,373,830 | 12/1994 | Denz et al. | 123/520 |
| 5,398,661 | 3/1995 | Denz et al. | 123/520 |
| 5,398,662 | 3/1995 | Igarashi et al. | 123/520 |
| 5,411,004 | 5/1995 | Busato et al. | 123/520 |

FOREIGN PATENT DOCUMENTS 4003751  8/1991  Germany .

*Primary Examiner*—Thomas N. Moulis
*Attorney, Agent, or Firm*—Edwin E. Greigg; Ronald E. Greigg

[57] ABSTRACT

A method of ventilating vapors from a fuel tank into an intake pipe of an internal combustion engine in the upper partial-load range and in the region of the full load on the internal combustion engine, a regeneration valve is first of all moved into an open position and a shut-off valve provided in a ventilating conduit of an adsorption filter is then closed. The fuel vapors then flow into the intake pipe by virtue of the intake pipe vacuum and assisted by the vapor pressure of the fuel in the fuel tank and then burned in at least one combustion space of the internal combustion engine. The method according to the invention for ventilating a fuel system is intended for use in motor vehicles.

6 Claims, 1 Drawing Sheet

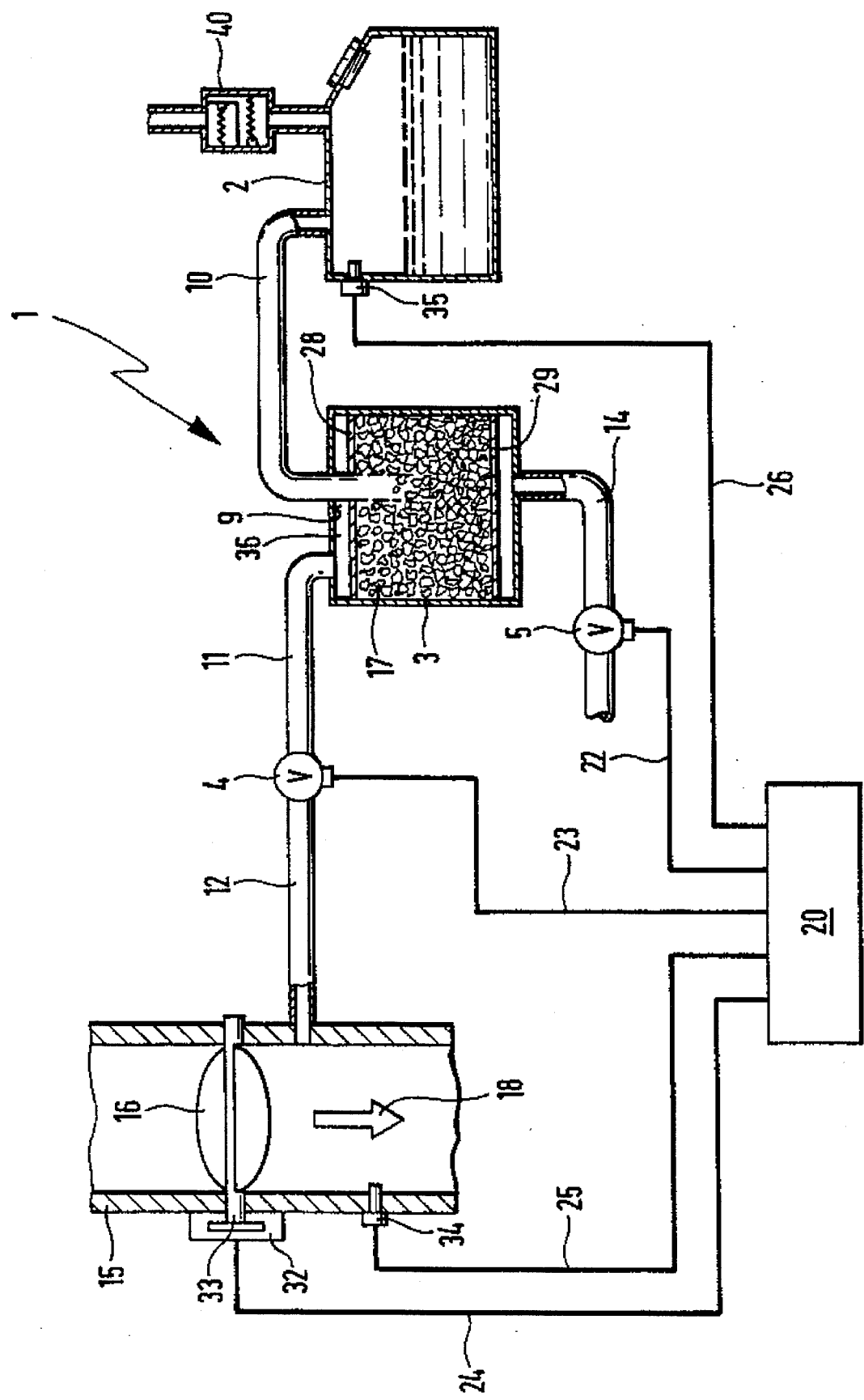

METHOD FOR VENTILATING A FUEL SYSTEM FOR AN INTERNAL COMBUSTION

PRIOR ART

The invention is based on a method for ventilating a fuel system for an internal combustion engine, according to the generic type of claim 1. A fuel system is already known (German Offenlegungsschrift 4,003,751) in which the fuel vapors which evolve in a fuel tank of an internal combustion engine are extracted in order, for environmental reasons, to avoid emissions, especially hydrocarbon emissions, into the environment. The fuel vapors are passed from the fuel tank via a tank conduit into an adsorption filter in the form of an activated-carbon filter which adsorbs, or retains and temporarily stores, the fuel vapors. Because of the limited capacity of an adsorption filter of this kind, it must be regenerated, i.e. flushed with air, for which purpose a ventilation conduit is provided on the adsorption filter. The vacuum which arises in an intake pipe of the internal combustion engine during operation causes air to be sucked into the adsorption filter from the environment via the ventilation conduit, the fuel stored in the adsorption filter being taken along and mixing with the air drawn in, subsequently being introduced into the intake pipe via a regeneration valve in the form of a fuel/air mixture and burnt in at least one combustion space of the internal combustion engine. The regeneration valve inserted between the adsorption filter and the intake pipe and controlled by an electronic control unit here ensures that the fuel/air mixture is only introduced into the intake pipe in selected operating ranges of the internal combustion engine in order to ensure, on the one hand, that the exhaust emissions from the internal combustion engine are not increased and, on the other hand, that high smoothness of running of the internal combustion engine is maintained. The proportion of fuel/air mixture introduced into the intake pipe depends essentially on the pressure difference between the vacuum prevailing in the intake pipe and the ambient pressure, but for reasons of performance and low exhaust emissions only a little fuel/air mixture can be introduced into the intake pipe while the internal combustion engine is idling, despite the high pressure difference. At higher speeds of the internal combustion engine, in the region of the upper partial load and, especially, in the full-load range, in contrast, introduction of the fuel/air mixture into the intake pipe could be envisaged without problems, without impairing performance and increasing the exhaust emissions, but this is not possible because of the small pressure difference between the intake pipe vacuum and ambient pressure at relatively high speed.

The apparatus mentioned at the outset furthermore has a shut-off valve which is provided on the ventilation conduit of the adsorption filter and is, like the regeneration valve, activated by the electronic control unit so as to shut off the ventilation conduit in the closed position. The shut-off valve is activated exclusively for purposes of checking the leaktightness and functionality of the fuel system and activation is performed only at certain intervals, for example each time the internal combustion engine is started, and only in certain operating ranges of the internal combustion engine, more specifically in the low partial-load range, especially when the internal combustion engine is idling. During the checking process, both the regeneration valve and the shut-off valve are activated by the electronic control unit to ensure that the regeneration valve assumes an open position and the shut-off valve assumes a closed position, thus allowing the vacuum which prevails in the intake pipe during the operation of the internal combustion engine to propagate to the fuel tank. A pressure sensor accommodated in the fuel tank is here used to monitor the build-up of the vacuum in the fuel tank. This vacuum can only assume a certain value, approximately the same as the intake pipe vacuum, if the fuel system is leak tight and functional. If this value is attained, the fuel system can be assumed to be functional and leaktight. In all other operating ranges, in the upper partial-load range and, especially, in the full-load range, the shut-off valve is not activated by the electronic control unit and remains in the open position since, for all practical purposes, there is no possibility of monitoring the build-up of the vacuum in the fuel tank due to the low pressure difference between the intake pipe vacuum and ambient pressure.

ADVANTAGES OF THE INVENTION

In contrast, the method according to the invention with the features of claim 1 has the advantage that ventilation of the fuel system is additionally performed in upper partial-load and, especially, full-load operating ranges of the internal combustion engine. In this case, the proportion of fuel/air mixture that could possibly be introduced into the intake pipe in the lower partial-load range is advantageously reduced, making it possible to achieve improved performance with lower exhaust emissions.

Advantageous further developments and improvements of the method specified in claim 1 are possible by virtue of the measures presented in the subclaims.

DRAWING

An exemplary embodiment of the invention is depicted in simplified form in the drawing and explained in greater detail in the description which follows.

DESCRIPTION OF THE EXEMPLARY EMBODIMENT

The drawing shows schematically a fuel system, denoted by 1, of an internal combustion engine with a fuel tank 2 used to supply the internal combustion engine (not shown in greater detail) with fuel. The method according to the invention for ventilating the fuel system 1 is intended, in particular, for use in motor vehicles. The fuel system 1 has an electromagnetically actuable regeneration valve 4 and an adsorption filter 3 which is connected to the fuel tank 2 by a tank conduit 10 and to the regeneration valve 4 by a connecting conduit 11. In stationary phases or in operating ranges of the internal combustion engine in which the regeneration valve 4 is closed, the volatile constituents of the fuel which are emitted in the form of gas from the fuel tank 2 flow via the tank conduit 10 into the adsorption filter 3, where they are adsorbed or retained and temporarily stored. In order to ensure that no fuel vapors can escape into the environment from the fuel tank 2 via a ventilation conduit 14 provided on the adsorption filter 3, this filter has an adequately dimensioned overall volume with a corresponding storage capacity for fuel vapors to ensure that the fuel vapors are stored in the adsorption filter 3 and at most air can flow out of the ventilation conduit 14. The adsorption filter 3 is partially filled with an adsorption medium, in particular with activated carbon 17, which is enclosed between two permeable boundary walls 28, 29 in the interior of the adsorption filter 3. The adsorption filter 3 shown in the drawing is, for example, of so-called immersed-probe construction, in which a single inlet of the tank conduit 10 projects into the activated carbon 17, the connecting conduit 11 being connected to a cavity 36 of the adsorption filter 3. The cavity 36 is bounded by an inner wall 9 of the adsorption filter 3 and by the boundary wall 28 shown at the top in the drawing. It is also possible to make the adsorption filter 3 of so-called short-circuit construction, in which the tank conduit 10 and the connecting conduit 11, for example, are connected directly to one another by means of a connecting branch of T-shaped design (not shown specifically), with the result that only a single inlet extends into the cavity 36 of the adsorption filter 3 at the transition from the tank conduit 10 to the connecting conduit 11.

During the operation of the internal combustion engine, a vacuum prevails in an intake pipe 15 of the internal combustion engine so that, with the regeneration valve 4 open and the ventilation conduit 14 open to the environment, the fuel vapors in the fuel tank 2 and, in particular, the fuel temporarily stored in the adsorption filter 3 are extracted. During this process, air flows from the environment, via the ventilation conduit 14, into the adsorption filter 3 due to the vacuum in the intake pipe 15 and the fuel stored in the activated carbon 17 is taken along. The air drawn in is thereby enriched with fuel and the adsorption filter 3 is regenerated. The air mixed with fuel then flows via the connecting conduit 11 in the form of a fuel/air mixture to the regeneration valve 4 and, from the latter, via a valve conduit 12, into the intake pipe 15 downstream of a throttle valve 16. Flowing in the intake pipe 15 in the direction of an arrow 18 drawn in is a medium, for example air or a fuel/air mixture, which mixes with the fuel/air mixture introduced and is then burnt downstream of the throttle valve 16 mounted rotatably in the intake pipe 15 in at least one combustion space of the internal combustion engine.

However, the introduction of the fuel/air mixture into the intake pipe 15 must only be performed selectively, i.e. only in selected operating ranges of the internal combustion engine in order to ensure, on the one hand, that the exhaust emissions from the internal combustion engine are not increased and, on the other hand, that a high smoothness of running of the internal combustion engine is maintained. To determine the operating ranges, an electronic control unit 20 is provided and this evaluates electrical signals from sensors, for example from a speed sensor (not shown specifically) which records the engine speed, so as to activate the regeneration valve 4 in an appropriate manner only in selected operating ranges of the internal combustion engine. In addition to the speed sensor, a resolver 32 in the form of a precision potentiometer is provided and this is connected by a control line 24 to the electronic control unit 20, is mounted for rotation in common on a positioning shaft 33 of the throttle valve 16 and assumes a particular resistance value or supplies a particular voltage signal to the electronic control unit 20 in accordance with the respective rotational position of the throttle valve 16. From the rotational position of the throttle valve 16 or from the voltage signals of the resolver 32, it is possible with the aid of the electronic control unit 20 to determine the current operating state of the internal combustion engine, especially idling and full load, it being possible to calculate the intake pipe vacuum in the intake pipe 15 indirectly from the rotational position of the throttle valve 16. It is also possible, as illustrated in the exemplary embodiment, to provide a first pressure sensor 34 downstream of the throttle valve 16 in the intake pipe 15 to determine the intake pipe vacuum. The first pressure sensor 34 is connected to the electronic control unit 20 by a control line 25 in order to supply the control unit 20 with an electrical signal in accordance with the intake pipe vacuum prevailing in the intake pipe 15.

The regeneration valve 4 is connected to the electronic control unit 20 by a control line 23 and is activated by the latter only in certain operating ranges of the internal combustion engine—these being determined by sensors—so as to introduce the fuel/air mixture into the intake pipe 15 in the open position via the valve conduit 12. The electronic control unit 20 is also connected, via a control line 22, to an electromagnetically actuable shut-off valve 5, which is provided on the ventilation conduit 14 of the adsorption filter 3, assuming a closed position in the energized condition and an open position in the de-energized condition, for example. As can be gathered from the document mentioned at the outset, German Offenlegungsschrift 4,003,751, a shut-off valve 5 of this kind is there used exclusively for purposes of checking the functionality and leaktightness of the fuel system 1 and is activated, i.e. closed, briefly by the electronic control unit 20 only in the lower load range, in particular when the internal combustion engine is idling, at certain intervals, e.g. each time the internal combustion engine starts. Checking of the fuel system 1 or activation of the shut-off valve 5 is performed only in the lower load range, in particular when the internal combustion engine is idling, since it is only in this operating range that there is a sufficient pressure difference between the intake pipe vacuum and the ambient pressure. In this arrangement, the vacuum build-up in the fuel tank 2 is monitored, after the closure of the shut-off valve 5 and the opening of the regeneration valve 4, by means of a second pressure sensor 35 accommodated in the fuel tank 2. If the fuel system 1 is functional, this vacuum build-up must correspond approximately to the intake pipe vacuum. The second pressure sensor 35 is connected to the electronic control unit 20 by a control line 26 in order to supply the control unit 20 with electrical signals in accordance with the vacuum prevailing in the fuel tank 2. In all other operating ranges of the internal combustion engine, in the region of upper partial load and, especially, in the region of full load, it is not possible to check the fuel system 1 since the pressure difference between the intake pipe vacuum and the ambient pressure would be too small for this purpose since only a small vacuum builds up in the fuel tank 2.

According to the invention, the shut-off valve 5 is, for example, in addition to the checking of the fuel system 1, also activated by the electronic control unit 20 in the upper partial-load range and, in particular, in the region of the full load on the internal combustion engine so as to shut off the ventilation conduit 14 in the closed position to prevent air from the environment flowing into the ventilation conduit 14 and into the adsorption filter 3. Simultaneously with the activation of the shut-off valve 5 or before the activation of the shut-off valve 5, the regeneration valve 4 is likewise activated by the electronic control unit 20 so that it is in the open position in order, with the regeneration valve 4 open and the ventilation conduit 14 shut off, to introduce fuel vapors from the fuel tank 2 into the adsorption filter 3 via the tank conduit 10 and from the said filter, via the connecting conduit 11, to the regeneration valve 4 and, via the valve conduit 12, into the intake pipe 15 in the region of the upper partial load and, in particular, in the region of the full load on the internal combustion engine. The outflow of the fuel vapors from the fuel tank 2 into the intake pipe 15 is caused by a pressure difference between the intake pipe vacuum in the intake pipe 15 and the vapor pressure in the fuel tank 2, made up of individual partial pressures of the individual components of the fuel. This pressure difference decreases again when the regeneration valve 4 is opened by virtue of a compensating flow, and, assisted by the intake pipe vacuum, the fuel vapors flow from the fuel tank 2 or the adsorption filter 3 into the intake pipe 15. This is the case only in the upper partial-load range and, especially, in the full-load range of the internal combustion engine since it is only in these operating ranges that the magnitude of the intake pipe vacuum relative to the ambient pressure is less than the magnitude of the excess pressure in the fuel tank relative to the ambient pressure. The compensating flow is particularly pronounced especially when the fuel has warmed up due to the operation of the internal combustion engine, since a relatively large amount of fuel gases in the fuel tank 2 when the fuel is warm, resulting in a large pressure difference between the intake pipe vacuum and the vapor pressure in the fuel tank 2, this being reduced again in the region of the upper partial load and, in particular, in the region of the full load on the internal combustion engine by the compensating flow when the regeneration valve 4 is opened with the shut-off valve 5 closed, whereupon fuel vapors from the fuel tank 2 are introduced into the intake pipe 15. For example, a considerable vapor pressure builds up in the fuel tank 2 with the regeneration valve 4 closed and the shut-off valve 5 closed in the case of a commercially available fuel, for example that for a mixture-compressing, applied-ignition internal combustion engine, even at a relatively low fuel temperature of about 40° celsius, and may assume values of over 1.9 bar excess pressure in the fuel tank 2.

The introduction according to the invention of the fuel vapors in the region of the upper partial load and, in particular, in the region of the full load on the internal combustion engine in addition to the conventional procedure of introducing it in the lower partial-load range has the advantageous effect that the proportion of fuel vapors which could be introduced in the lower partial-load range, particularly when the internal combustion engine is idling, is significantly reduced, making it possible to achieve improved performance with reduced exhaust emissions. The introduction according to the invention of the fuel vapors in the region of the upper partial load and, in particular, in the region of the full load can be accomplished very easily, without impairing performance and without increasing exhaust emissions since, in these operating ranges, a maximum of fuel is already being fed for combustion by injection units provided for the internal combustion engine, with the result that the proportion accounted for by the fuel vapors introduced via the regeneration valve 4 does not have a disadvantageous effect.

Since it can occur, on the one hand, that the shut-off valve 5 on the adsorption filter 3 remains in the closed position, due, for example, to a defect, and, on the other hand, that the internal combustion engine is subjected, while stationary and with the regeneration valve 4 closed, to a severe temperature increase, increased evolution of fuel vapors can lead to the build-up of an extreme excess pressure in the fuel tank 2 and, for safety reasons, this must then escape into the environment via a safety device 40, provided on the fuel tank 2, in the form of a pressure relief valve. In addition, the safety device 40 also comprises a vacuum relief valve since the shut-off valve 5 may also remain in the closed position during a journey, while the internal combustion engine is operating, with the result that the opening of the regeneration valve. 4 may lead to a considerable vacuum in the fuel tank 2, which must then for safety reasons be balanced by means of air flowing into the fuel tank 2 by opening the vacuum relief valve.

I claim:

1. A method for ventilating a fuel system for an internal combustion engine, in which fuel vapors from a fuel tank can be introduced into an intake pipe of the internal combustion engine via an adsorption filter and a regeneration valve which assumes an open position or a closed position, the adsorption filter being connected to the atmosphere by a shut-off valve in a ventilation conduit, said shut-off valve assuming an open position or a closed position, which comprises moving the regeneration valve (4) into an open position and moving the shut-off valve (5) into a closed position to introduce the fuel vapors into the intake pipe (15) in a region of an upper partial load and/or in a region of a full load on the internal combustion engine.

2. The method as claimed in claim 1, wherein the regeneration valve (4) is first of all moved into an open position and the shut-off valve (5) is then moved into a closed position.

3. The method as claimed in claim 1, wherein the regeneration valve (4) is moved into an open position and the shut-off valve (5) is moved into a closed position approximately simultaneously.

4. The method as claimed in claim 1, wherein the regeneration valve (4) and the shut-off valve (5) are designed as electromagnetically actuable valves.

5. The method as claimed in claim 1, which comprises setting a resolver (32) provided on a throttle element (16) for the purpose of determining a range in which the internal combustion engine is operated.

6. The method as claimed in claim 1, which comprises positioning and operating a first pressure sensor (34) in the intake pipe (15) downstream of a throttle element (16) of the internal combustion engine for the purpose of determining the range in which the internal combustion engine is operated.

* * * * *